Patented Sept. 7, 1937

2,092,308

UNITED STATES PATENT OFFICE 2,092,308

INSECTICIDAL DUST

Charles B. Gnadinger, Minneapolis, Minn.

No Drawing. Application February 21, 1935,
Serial No. 7,551

3 Claims. (Cl. 167—24)

This invention relates to a process for the production of insecticidal dusts suitable for large scale horticultural use, and also relates to products for the same purpose.

Powdered pyrethrum has been used alone for a dust for many years for killing insects. It has also been employed mixed with dilutents or fillers such as talc, sulphur, etc., for the same purpose. The proportion of pyrethrum used has been as low as 10%. Kerosene extracts of pyrethrum mixed with suitable filler have also been made. The pyrethrin (active principle) content of pyrethrum flowers is usually 1% or less and the pyrethrin content of commercial dusts is generally much lower. When pure powdered pyrethrum is used as a dust, a considerable part of the active principle of the flower is held within the cell walls and hence does not come into contact with the insect.

There are several difficulties involved in profitably producing and marketing a pyrethrum dust for large scale horticultural uses, such as spreading by airplane, for example. Unless the dust is manufactured near the source of supply of the filler, and also near the area where the dust is to be used, the freight on filler and finished dust renders the cost prohibitive.

In order to produce a dust which will work satisfactorily in a commercial duster, it is necessary that the dust be rather dry, but this is objectionable in that more rapid oxidation of the pyrethrins, which reduces the insecticidal efficiency, takes place.

The use of powdered pyrethrum flowers in large scale application has been tried, but the cost is prohibitive because a large part of the pyrethrin content is held within the cell walls and does not come in contact with the insect. Powdered pyrethrum mixed with dilutent, such as lime or sulphur, is cheaper than the powdered flowers, but not so effective, being open to the same objection as the flowers.

Pyrethrum extracts made with volatile extractants have been tried but the volatile solvent soon evaporates leaving the pyrethrins unprotected and in an ideal condition for oxidation or decomposition. Furthermore, warming of such a mixture accelerates decomposition. In this invention, a non-volatile solvent is used to avoid the above mentioned objections.

Oleo resin of pyrethrum mixed with filler is not satisfactory because of the difficulty of mixing and because decomposition of pyrethrins is rapid.

In order to avoid all of the above difficulties, I have invented a new type of dust which may best be described as "concentrated pyrethrum dust".

In preparing this new type of dust, I first make a very concentrated extract of pyrethrum, containing, for example, the active principles from about 40 to about 200 pounds of high test flowers in each gallon. The solvent used may be pine oil, decalin, or other relatively non-volatile solvents. I then mix this concentrated extract with a suitable filler having high absorbent properties, such as diatomaceous earth. It is sometimes desirable to use an anti-oxidant to prevent oxidation of the pyrethrins, and when this is used, it is dissolved in the concentrated extract before mixing the extract with the absorbent material, thus affording better protection for the active principle than when the solid anti-oxidant is mixed directly with the dust.

The product resulting from the above process and which is claimed per se, is not suitable for dusting, being somewhat moist and inclined to cake. To employ it for dusting, it is mixed with a filler such as talc, gypsum, spent lime from sugar refineries, diatomaceous earth, bentonite or other suitable filler, preferably highly absorbent, and available at the place where the material is to be used.

The problem of profitably producing a practicable pyrethrum dust for large scale commercial use has remained unsolved for a long time. I believe myself the first to ever conceive of the production of a high pyrethrum content, dust or dust-like or solid product, which can be shipped at small expense in concentrated form to point of use, and which can then be diluted with a filler to make a dust suitable for large scale horticultural use. A filler-dilutable, filler-containing high pyrethrin content solid mixture, seems to be broadly new.

The following will serve as one example: Prepare an oleo-resin of pyrethrum by any suitable process. Then prepare from the oleo-resin, a concentrated extract of pyrethrum in decalin as described in my copending application Serial Number 717,430. This concentrated extract is standardized to contain, for example, 14.5% of pyrethrins (equivalent to the active principles from about 120 pounds of high test flowers in one gallon of decalin extract). Fifty pounds of the decalin extract are mixed with about fifty pounds of diatomaceous earth, the earth being selected for its high absorbing properties. Other suitable fillers may be used. The resulting solid mixture is then packed in tight cans for shipment. The concentrated solid dust is a feature of this invention.

To prepare the material for use, 2½ to 3½ pounds of it are mixed with about 97 to about 97.5 pounds of talc, gypsum, lime stone, diatomaceous earth, or other available and suitable filler. This mixture is easily and quickly effected. The finished dust, ready for application to the plant, contains from 0.19% to 0.23% pyrethrins which is the equivalent of 20% to 25% of high test pyrethrum flowers. Stronger mixtures can, of course, be made. I believe it new to mix the active insecticidal with a filler, and then thereafter mix that mixture with additional filler at point of use. I believe it new to make a moist product not suitable for dusting, and then to dilute or mix it with filler for the purpose herein. I also believe it new to make the pyrethrin concentration very high, and use the moist product for further dilution with filler.

When the concentrated dust is made with decalin, it can be assayed for its pyrethrin content by the copper reduction method or acid method. Other solvents, such as pine oil, turpentine, dibutyl ether, etc., can be used in lieu of decalin for preparing the concentrated extract.

By this invention, an exceptionally highly concentrated pyrethrum extract in a non-volatile substance, is mixed with filler of high absorptive capacity, to yield a product which is not a dust (because too moist for dusting) and which contains from 5% to 10% of pyrethrins. This product can then be shipped to the point of use at which it is diluted with any suitable filler in the proportion of about 2 to 3 pounds of concentrate, to 97 to 98 pounds of filler. While making the final dilution preparatory to use, I preferably add a small amount of solvent, such as pine oil or other suitable mineral or vegetable oil, to redistribute the pyrethrin content, and protect this active insecticidal principle. The amount of solvent is about 1% to 5% by weight.

The proportion of decalin or other non-volatile extract to the earth or other filler, depends upon the absorbing ability of the filler, and it is best not to get too near the upper limit of the absorbing ability of the filler, so that one may be assured that there is sufficient filler to hold the solution without any free liquid.

The anti-oxidant, when used, is added in amount of about 2.5% of the weight of the concentrate, or less than 0.1% of the weight of the finished dust. Furthermore, more anti-oxidant is required where the same is simply mixed with a dry dust, than where the anti-oxidant is first dissolved, as I dissolve it, in the pyrethrum extract.

I claim as my invention:

1. A moist, cakable, insecticidal product comprising an extract of pyrethrum carried by a non-volatile solvent therefor, and an inert filler.

2. A moist, cakable, insecticidal product comprising an extract of pyrethrum carried by a non-volatile solvent therefor, and an inert filler, about 50% of each, and containing about 5 to 10% of pyrethrins.

3. A moist, cakable, insecticidal product comprising an extract of pyrethrum carried by decalin, and an inert filler.

CHARLES B. GNADINGER.